US012359594B2

(12) United States Patent
Ziebert et al.

(10) Patent No.: US 12,359,594 B2
(45) Date of Patent: Jul. 15, 2025

(54) CONVERTIBLE SILENCER

(71) Applicant: DISCOVERY ENERGY, LLC, Kohler, WI (US)

(72) Inventors: Joshua Ziebert, Kohler, WI (US); Billy Brandenburg, Horicon, WI (US)

(73) Assignee: Discovery Energy, LLC, Kohler, WI (US)

(*) Notice: Subject to any disclaimer, the term of this patent is extended or adjusted under 35 U.S.C. 154(b) by 0 days.

(21) Appl. No.: 18/787,622

(22) Filed: Jul. 29, 2024

(65) Prior Publication Data

US 2025/0043706 A1 Feb. 6, 2025

Related U.S. Application Data

(60) Provisional application No. 63/533,333, filed on Aug. 17, 2023, provisional application No. 63/530,136, filed on Aug. 1, 2023.

(51) Int. Cl.

| | |
|---|---|
| ***F01N 1/16*** | (2006.01) |
| ***F01N 1/08*** | (2006.01) |
| ***F01N 3/021*** | (2006.01) |
| ***F01N 3/10*** | (2006.01) |
| ***F01N 3/20*** | (2006.01) |
| ***F01N 3/28*** | (2006.01) |
| ***F01N 13/18*** | (2010.01) |
| ***F02B 27/02*** | (2006.01) |
| ***F02B 63/04*** | (2006.01) |

(52) U.S. Cl.

CPC ............. *F01N 1/161* (2013.01); *F01N 3/021* (2013.01); *F01N 3/106* (2013.01); *F01N 3/2066* (2013.01); *F01N 3/2892* (2013.01); *F01N 1/082* (2013.01); *F01N 1/165* (2013.01); *F01N 1/166* (2013.01); *F01N 13/1838* (2013.01); *F01N 2230/00* (2013.01); *F01N 2590/10* (2013.01); *F02B 27/0231* (2013.01); *F02B 63/04* (2013.01); *F02B 63/044* (2013.01); *F02B 63/047* (2013.01); *F02B 63/048* (2013.01)

(58) Field of Classification Search

CPC combination set(s) only.

See application file for complete search history.

(56) References Cited

U.S. PATENT DOCUMENTS

| | | | | |
|---|---|---|---|---|
| 3,714,449 A * | 1/1973 | De Bella | F02B 63/04 | 290/1 C |
| 4,316,522 A | 2/1982 | Hischorn | | |
| 5,578,277 A * | 11/1996 | White | F01N 3/2892 | 422/612 |
| 5,670,757 A | 9/1997 | Harris | | |

(Continued)

FOREIGN PATENT DOCUMENTS

| | | |
|---|---|---|
| CN | 208347873 U | 1/2019 |
| JP | 2004002624 A | 1/2004 |

(Continued)

*Primary Examiner* — Binh Q Tran

(74) *Attorney, Agent, or Firm* — The Belles Group, P.C.

(57) ABSTRACT

A silencer for noise reduction at an internal combustion engine is disclosed. The silencer comprises an input opening, an output opening, at least one chamber, and at least one partition configured to be inserted into and removed from the at least one chamber to convert the silencer to a collector.

19 Claims, 10 Drawing Sheets

(56) References Cited

U.S. PATENT DOCUMENTS

| | | | | | |
|---|---|---|---|---|---|
| 5,921,081 | A * | 7/1999 | Kim | F01N 1/166 181/278 |
| 8,397,493 | B1 * | 3/2013 | Cone | F01K 25/08 181/251 |
| 10,309,302 | B2 | 6/2019 | Wilhelm et al. | |
| 10,704,422 | B2 | 7/2020 | Davis et al. | |
| 11,411,459 | B2 * | 8/2022 | More | F01P 7/10 |
| 2005/0279571 | A1 * | 12/2005 | Marocco | F01N 13/04 181/270 |
| 2010/0072757 | A1 * | 3/2010 | Kealy | F02B 37/001 290/1 A |
| 2015/0233276 | A1 | 8/2015 | Cassity et al. | |
| 2021/0163470 | A1 | 6/2021 | Strombeck et al. | |

FOREIGN PATENT DOCUMENTS

| | | | |
|---|---|---|---|
| JP | 3515979 | B2 | 4/2004 |
| WO | 2007126945 | A1 | 11/2007 |

* cited by examiner

CONVERTIBLE SILENCER

CROSS-REFERENCE TO RELATED APPLICATIONS

This application claims the benefit under 35 U.S.C. § 119(e) of U.S. Provisional Application Ser. No. 63/530,136, entitled CONVERTIBLE SILENCER, which was filed on Aug. 1, 2023, and U.S. Provisional Application Ser. No. 63/533,333, entitled CONVERTIBLE SILENCER, which was filed on Aug. 17, 2023, the entire disclosures of which are incorporated by reference herein.

FIELD

This disclosure relates in general to a combustion noise suppression process or system for an internal combustion engine.

BACKGROUND

An internal combustion engine, as well as other devices, produce unwanted acoustic waves or noise. The combustion of air and fuel creates noise. The operation of pistons, crankshafts, gears, belts and pulleys creates noise. A muffler, which may also be referred to as a silencer, provides structure for reducing the noise or magnitude of the acoustic waves. The muffler may include materials that partially absorb the acoustic waves. The muffler may include structure that introduces destructive interference to reduce the magnitude of the acoustic waves. However, the muffler reduces the overall efficiency of the internal combustion engine. Challenges remain in maximizing the reduction in noise or magnitude of acoustic waves produced by the internal combustion engine while maintaining maximum efficiency.

BRIEF DESCRIPTION OF THE DRAWINGS

Objects, features, and advantages of the present disclosure should become more apparent upon reading the following detailed description in conjunction with the drawing figures, in which.

The figures illustrate certain exemplary embodiments of the present disclosure in detail. It should be understood that the present disclosure is not limited to the details and methodology set forth in the detailed description or illustrated in the figures. It should be understood that the terminology used herein is for the purposes of description only and should not be regarded as limiting.

DETAILED DESCRIPTION

Figure 1:
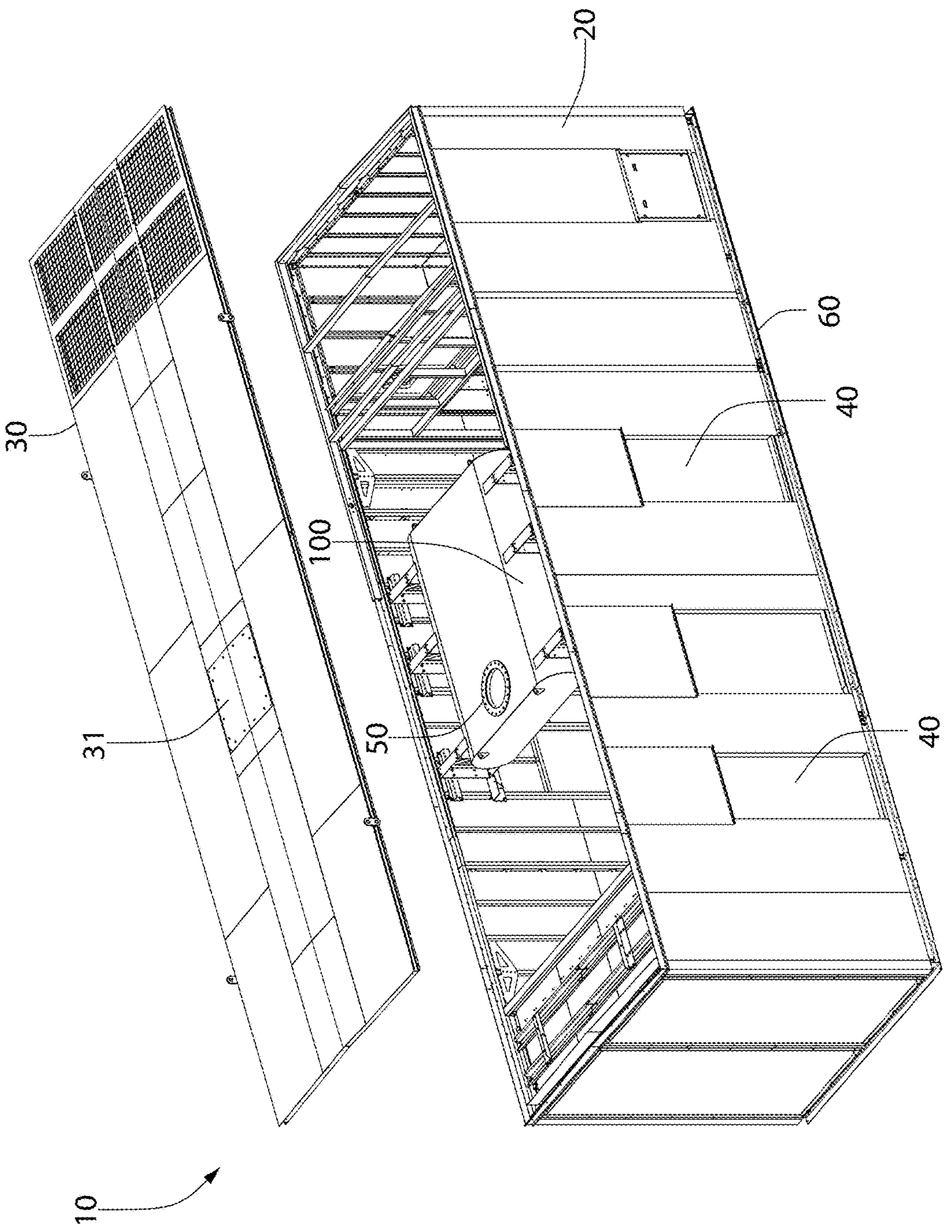
FIG. 1 illustrates an example generator including a convertible silencer.

FIG. 1 illustrates an example generator set 10 including a convertible silencer 100. The generator set 10 includes an internal combustion engine and an alternator or other electrical machine. The generator set 10 may include a housing 20 around the sides of the internal combustion engine and the alternator. A roof 30 covers the top of the housing 20 and the internal combustion engine and the alternator. The roof 30 may include an opening 31 for the exhaust (e.g., pipe) of the internal combustion engine. The opening 31 may be aligned with the output of the silencer 100. The generator set 10 may include one or more doors 40 for entering the housing 20. The generator set 10 may be supported by a skid or tank 60 for loading or otherwise moving the generator set 10. Other components of the generator set 10 are described below. Additional, different, or fewer components may be included.

The silencer 100 is considered convertible because it can be converted to a collector. A collector collects or consolidates exhaust from the internal combustion engine from multiple sources. Example sources for the exhaust include turbochargers and headers of the internal combustion engine.

Figure 2:
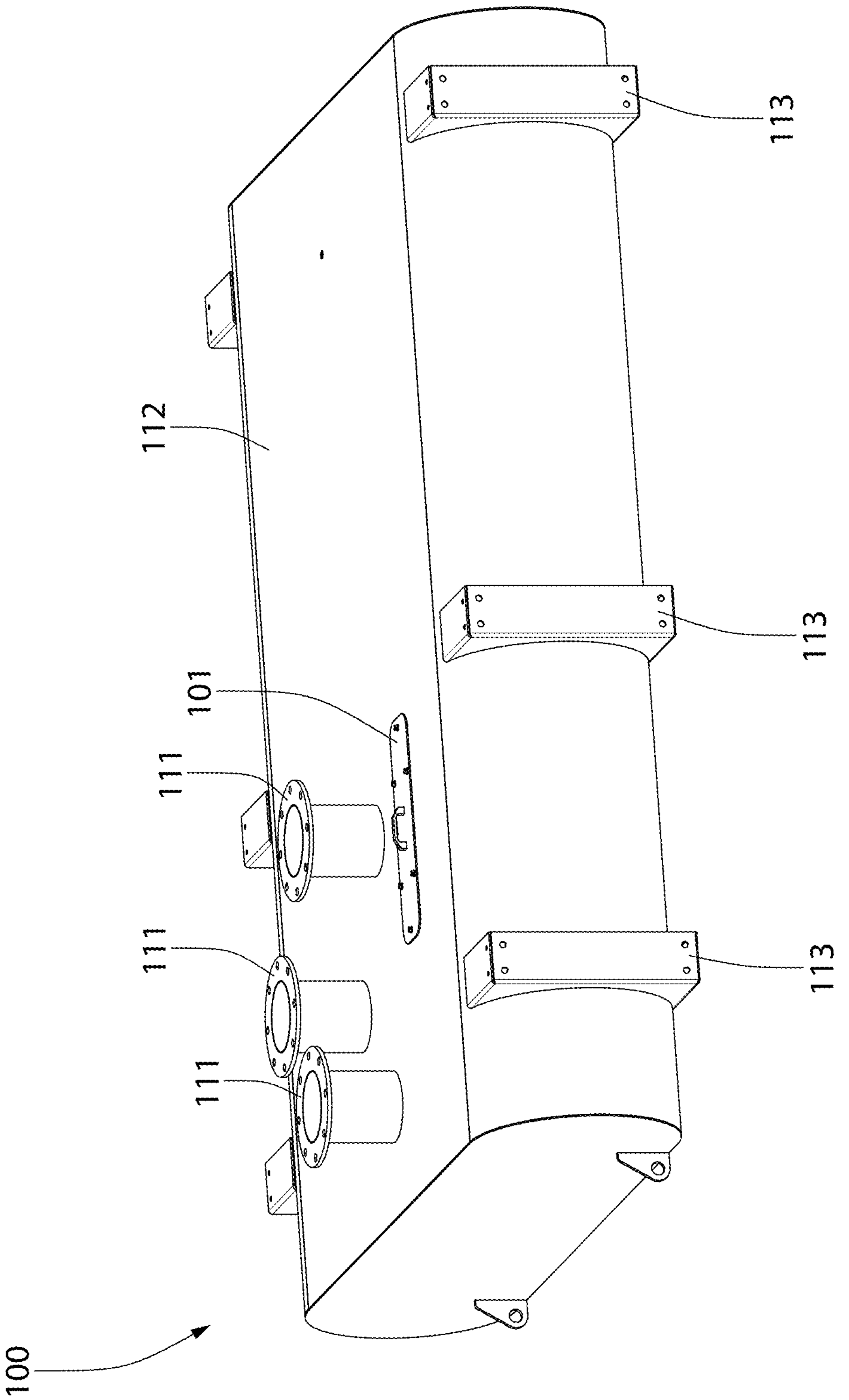
FIG. 2 illustrates an example convertible silencer.
Figure 3:
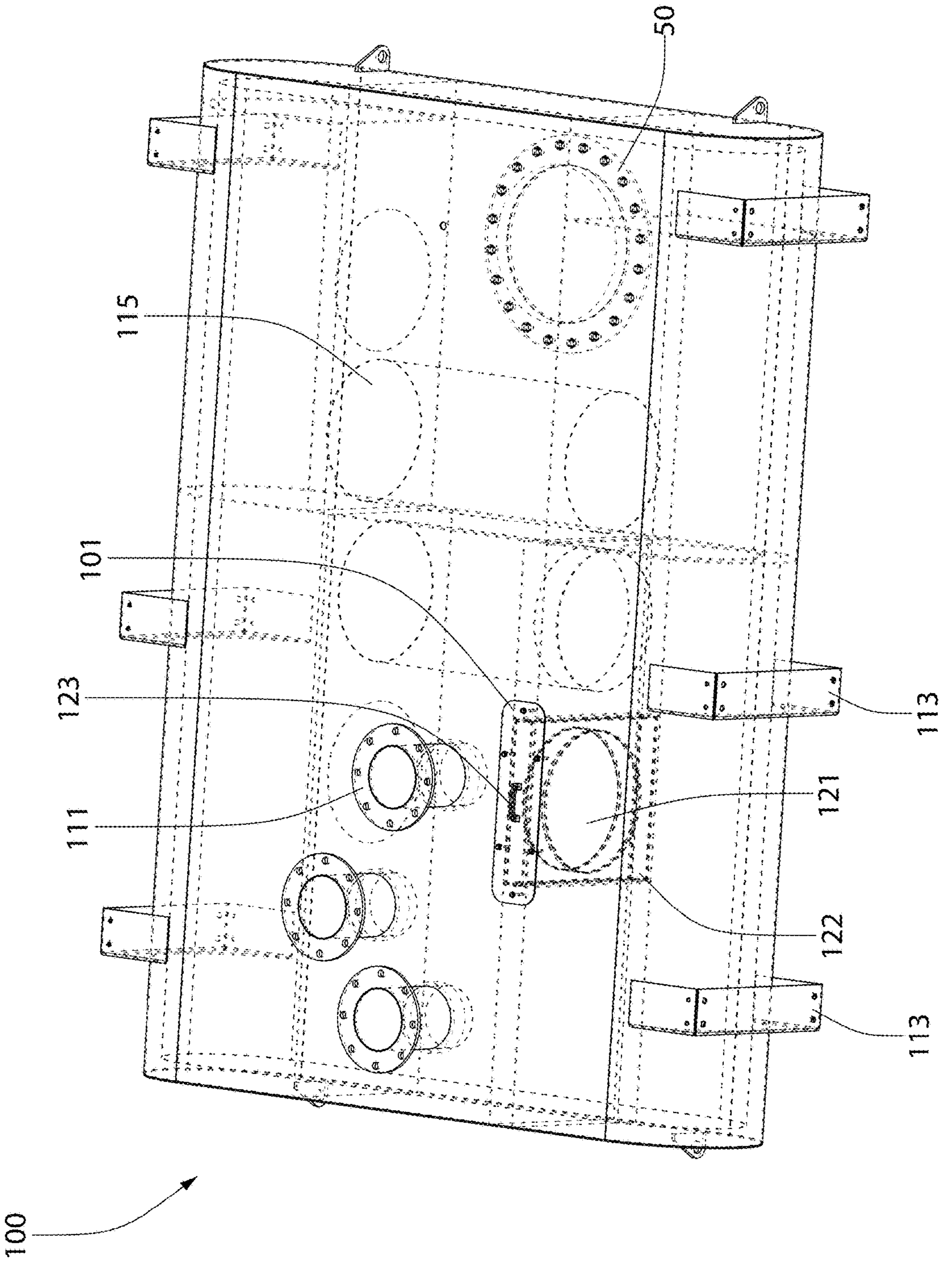
FIG. 3 illustrates an internal view of the convertible silencer of FIG. 2.
Figure 4:
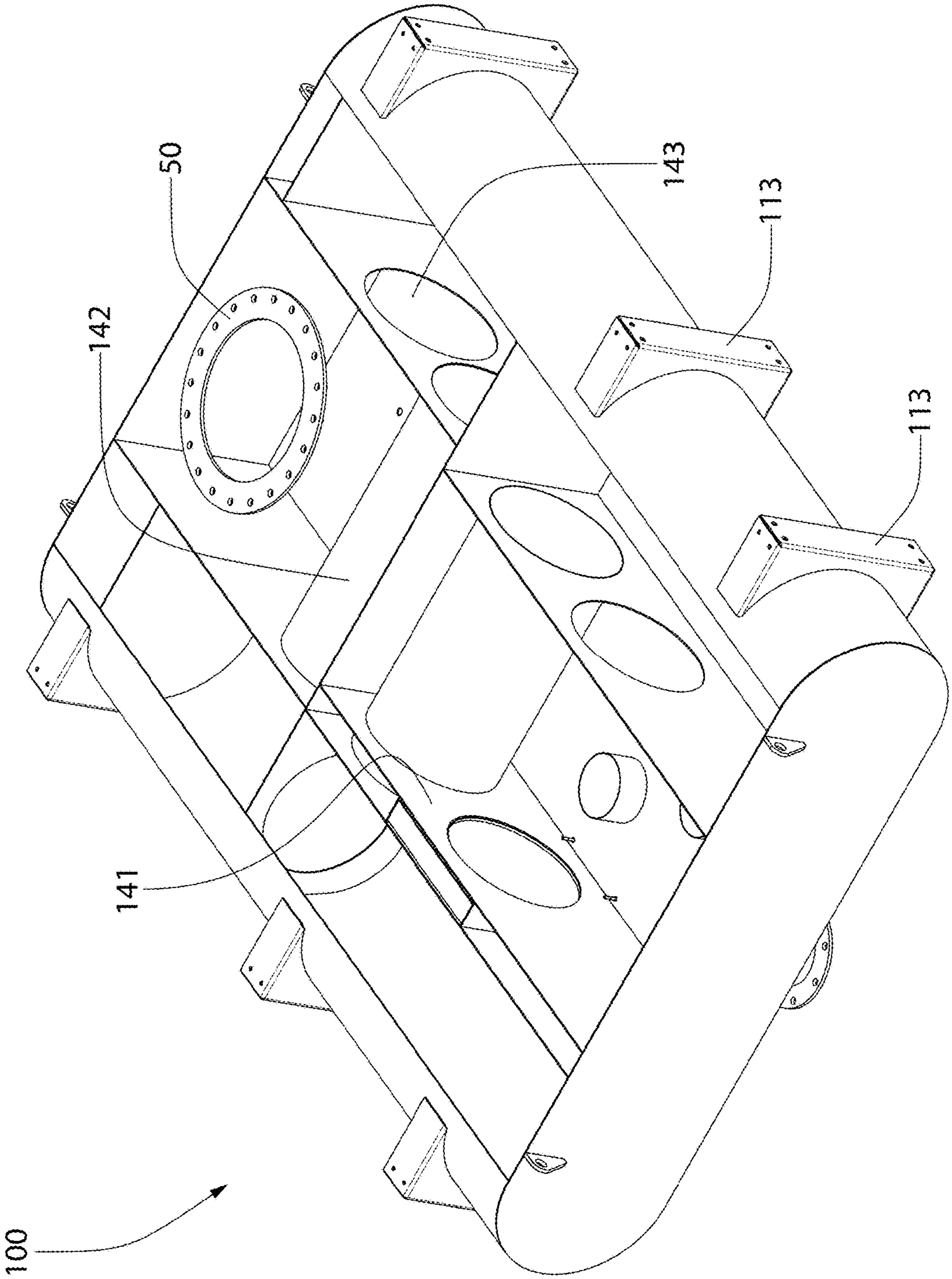
FIG. 4 is a bottom view of the convertible silencer of FIG. 2 illustrated with components removed for the purpose of illustration.

FIGS. 2-4 illustrates an example convertible silencer 100. FIG. 3 illustrates an internal view of the convertible silencer 100. Additional, different, or fewer components may be included.

The convertible silencer 100 may include one or more inlets or inlet openings 111, a housing 112, one or more mounts or brackets 113, an outlet 50, and at least one partition 101. Inside the housing 112 of the silencer 100 are one or more chambers 115. Various structures are possible to define the chambers 115 including walls 141, tubes 142, and apertures 143 between the tubes 142 and chambers 115. The outlet 50 is sized to align with the opening 31.

The inlet openings 111 and inlet pipes deliver exhaust gas from the engine to the silencer 100. As a valve connecting the engine and the input tube opens, an acoustic pressure wave generated from combustion is propagated through the inlet pipes. The silencer 100 helps to reduce the combustion generated sound waves through the chambers 115. At least one of the chambers 115 may be a resonant chamber configured to reflect sound waves from the engine such that the sound waves are subtracted or cancelled out. The sizes of the chambers 115, as well as the apertures and tubes therebetween, may be selected according to the type of engine, model of engine, model of generator, or the specific wavelengths of sound waves produced by the engine. The partial cancellation of one sound wave upon another may be referred to as destructive interference.

The partitions 101 further define the chambers 115 by dividing the space in the silencer 100 into predetermined sizes. The partitions 101 also provide air resistance to the exhaust traveling through the silencer 100. The silencer 100 is convertible by removing at least one partition 101. With the partition removed (or all partitions removed), the silencer 100 no longer includes chambers 115 defined according to the sound waves for partial cancellation of one sound wave upon another. Thus, the silencer 100 no longer functions as a muffler or functions as a muffler to a lesser extent. In addition, with less resistance from the silencer 100, the operation and efficiency of the engine is increased.

At least one partition 101 may be removed in response to the connection of an after treatment device to the engine. Example after treatment devices include a diesel particulate filter, a diesel oxidation catalyst device, and/or a selective catalytic reduction (SRC) device. These devices cause back pressure and lower the efficiency of the engine, however they also help to reduce the noise of the engine. In another example, the outlet 50 opening is connected to a pipe to discharge exhaust into the open air. Such a pipe also increases back pressure. The pipe may include, or be coupled to, a smoke stack or chimney.

The engine may include one cylinder, two cylinders or another number of cylinders. The one or more cylinders may generate noise or sound waves as a result of the oscillations of one or more pistons through the one or more cylinders, which are shaped to receive the one or more pistons. The one or more pistons may be guided through the one or more cylinders by a connecting rod that is connected to a crankshaft by a crankpin. A combustion chamber includes a combustion chamber adjacent to a head of the piston. The combustion chamber is formed in a cylinder head. The combustion chamber is connected to the muffler through an exhaust port. In one phase of a combustion cycle for the piston, the exhaust port is blocked from the combustion chamber by an exhaust valve, and in a subsequent phase, the exhaust port is in gaseous connection with the combustion chamber to release exhaust gas through the exhaust port to the muffler.

The combustion cycle may also generate noise or sound waves that travel to the silencer 100 through the cylinder head or housing or through the exhaust port. The connecting rod and crankpin may generate noise or sounds waves that travel to the silencer 100. The engine may include other sources of noise or sounds waves including a gearing system, a valve-train system (including valves hitting seats), an intake system including a manifold, a fuel supply, a speed governor, a cooling system, an exhaust system, a lubrication system, and a starter system.

The housing 112 of the silencer 100 may be formed from a metal such as steel and may include any combination of a sound absorbing material, a ferrous material, or an anti-corrosion material. Example materials include ferrous alloys, aluminum, aluminized steel, titanium alloys, and ceramics. Ferrous materials may be particularly resistant to the heat expelled by the engine. Anti-corrosion materials may prevent rust or other corrosion.

Figure 5:
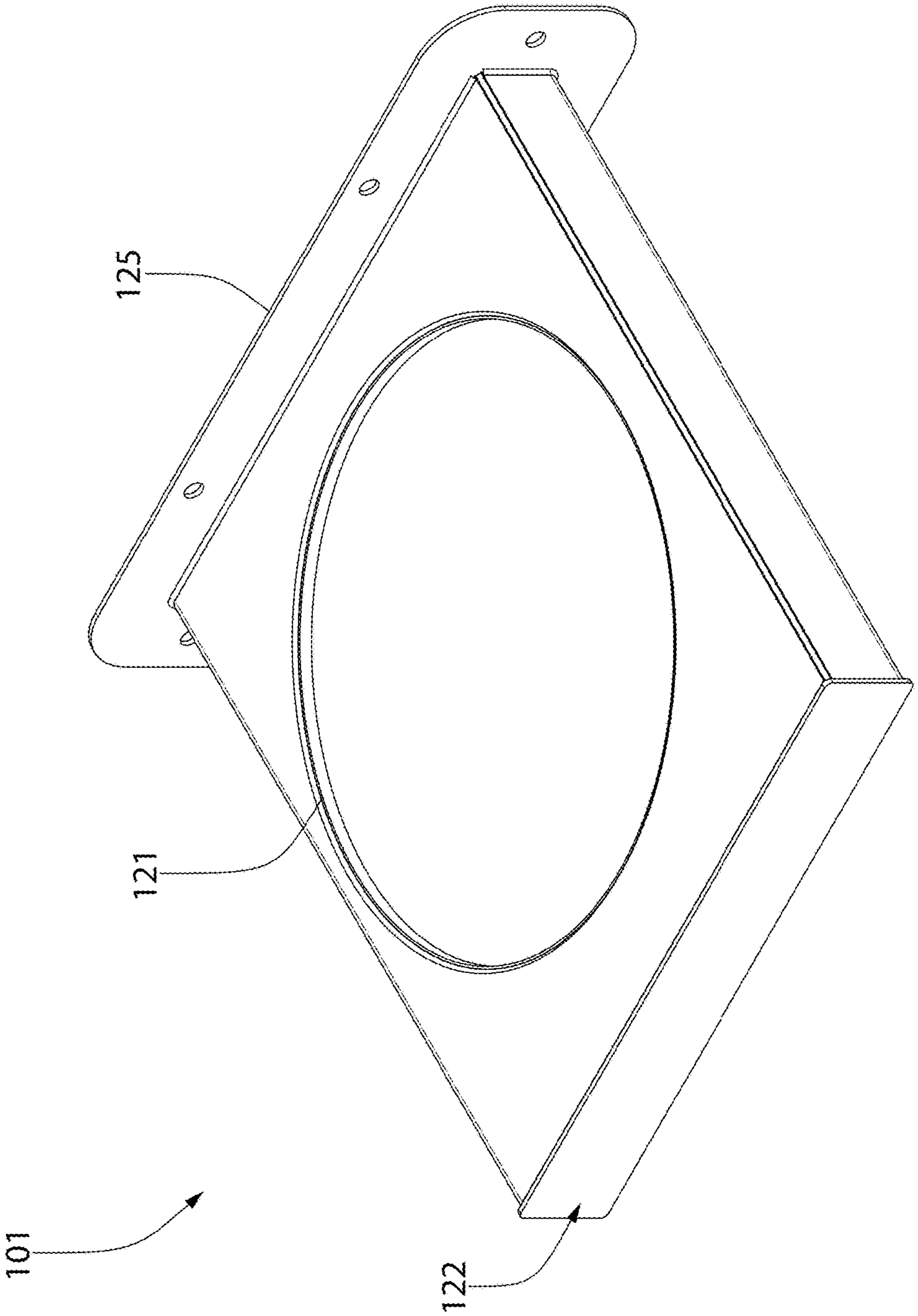
FIG. 5 illustrates an example partition for the convertible silencer of FIG. 2.

FIG. 5 illustrates an example partition 101 for the convertible silencer 100. The partition 101 may include a face plate 125 (including handle 123), and a body 122 having a ridge 121 defining a predetermined shape. The ridge 121 may be replaced with an indention, a protrusion, or another structure on the face of the body 122 that mates with or otherwise becomes aligned with at least a portion of the tube 142 or aperture 143.

The partition 101 may be formed from fiberglass. Fiberglass is lightweight and heat resistant. The partition 101 may be formed from another lightweight or heat resistant material. Other possible materials for the partition 101 include aluminum or any metal.

Figure 6:
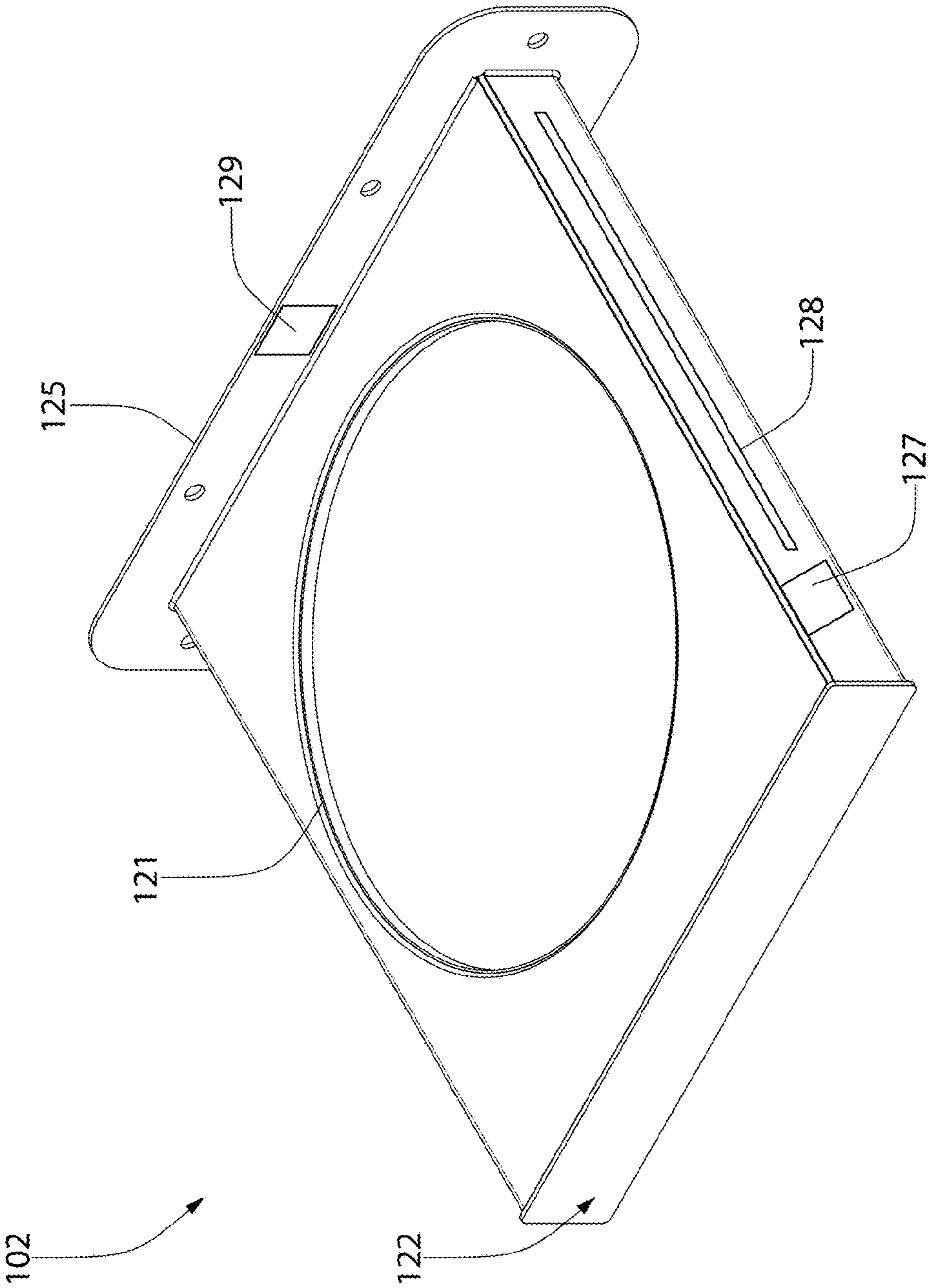
FIG. 6 illustrates an example partition for the convertible silencer of FIG. 2.

FIG. 6 illustrates an example partition 102 for the convertible silencer 100. In this example, the partition 102 includes a mounting device. For example, partition 102 includes a rail 128 and a stop 127. The rail 128 is associated with a groove in the silencer 100 to guide the partition 102 as it is installed and/or removed from the silencer 100. The partition 102 may include the rail 128 only on one side, or rails may be different on opposing sides, so that the partition 102 can only be inserted into the silencer 100 facing a predetermined direction. The stop 127 may protrude from the partition 102 to abut a protruding feature inside the silencer 100 to prevent the partition 102 from being inserted too far.

A lock 129 may also be included. The lock 129 selectively couples the partition 102 to the silencer 100. In some examples, the lock 129 may be rotated (locked and unlocked) by a key. In other examples the lock 129 may be manually turned to couple or uncouple the partition 102 to the silencer 100.

Figure 7:
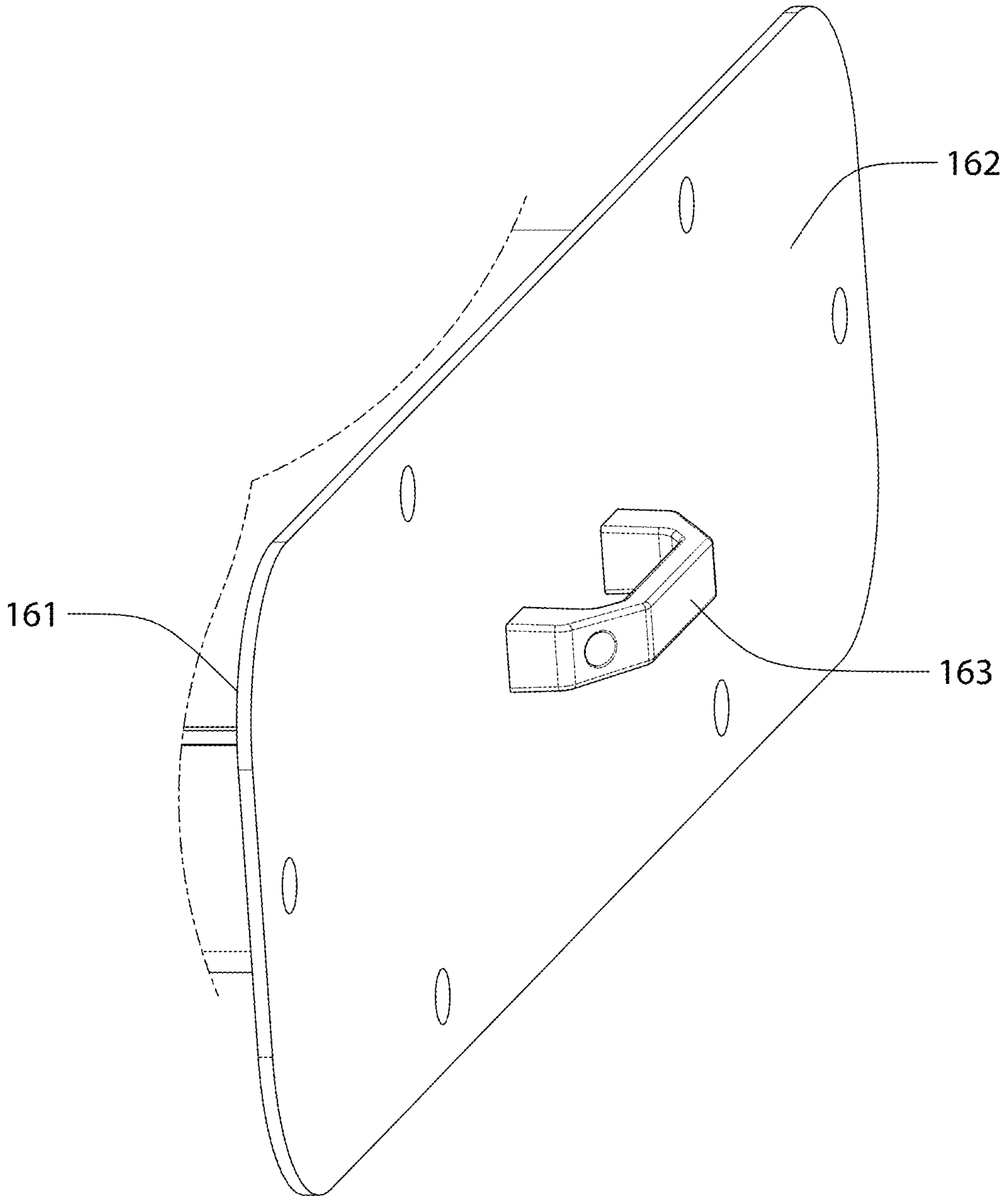
FIG. 7 illustrates an example blank insert for the convertible silencer of FIG. 2.

FIG. 7 illustrates an example blank insert 161 for the convertible silencer 100. The blank insert 161 may be inserted into the silencer 100 at the same location as the partition 101. However, the blank insert 161 does not include body 122 for blocking the tube or chamber of the silencer 100. The blank insert 161 covers the hole for the partition 101. The blank insert 161 includes a face 162 and a handle 163.

Figure 8:
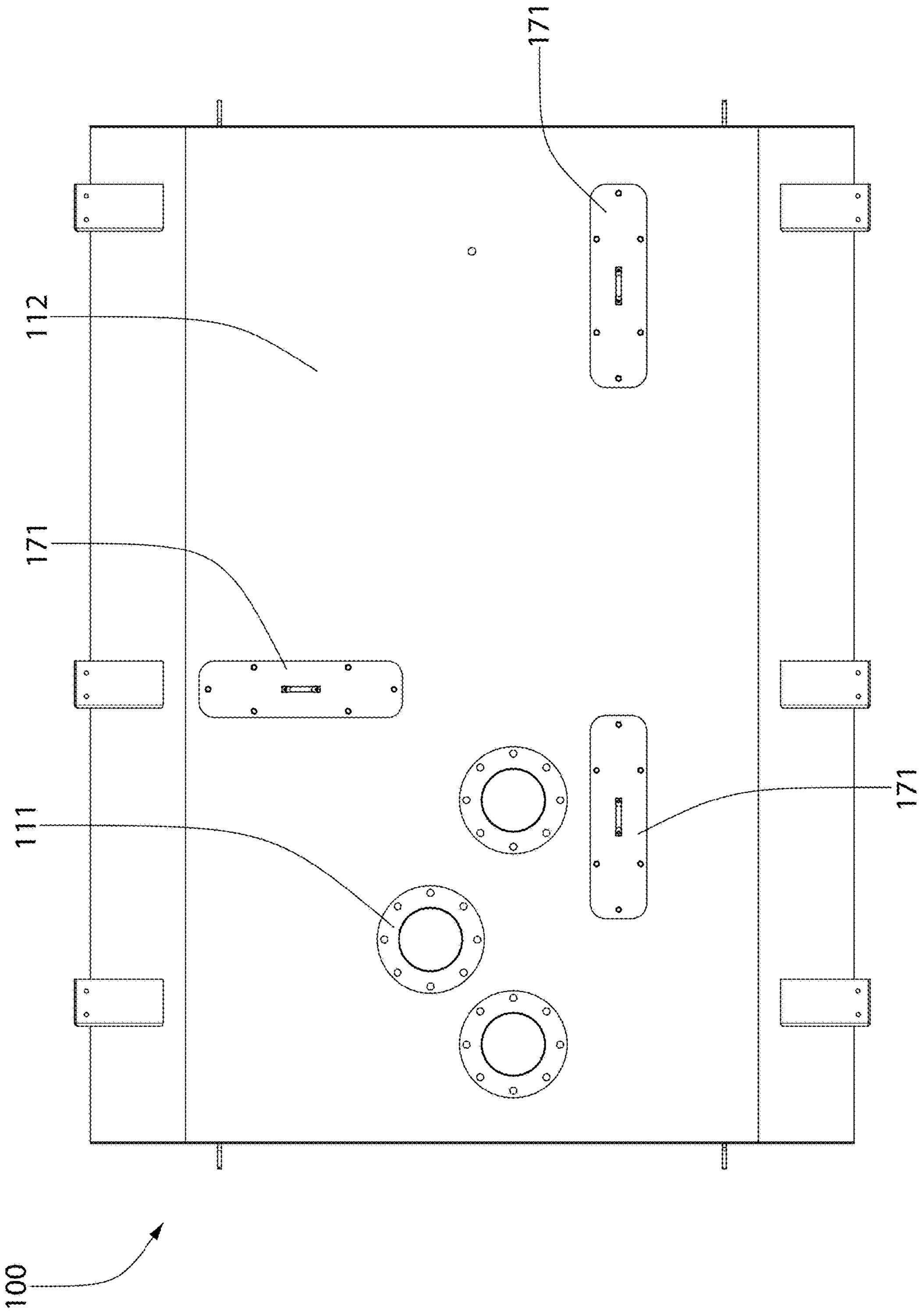
FIG. 8 illustrates another embodiment of a convertible silencer.

FIG. 8 illustrates another embodiment of a convertible silencer 100. The silencer 100 includes a plurality of partitions 171. Each of the partitions 171 may be associated with a different tube or chamber of the silencer 100. All of the partitions 171 may be removed to convert the silencer 100 to a collector. In other examples, only specific one or more of the partitions 171 may be removed. The partition to be removed may be selected based on a type of after treatment device that is connected to the engine or generator. The after treatment device affects back pressure in the at least one chamber 115. That is, energy is taken from the exhaust, which causes more work to be done to push the exhaust through the silencer. The after treatment device may have sound reduction capabilities. In some instances the silencer 100 and the after treatment device may be redundant in that the both have sound reduction capabilities. In these examples, the partitions 171 may be removed without causing a significant level of noise at the generator.

The partition to be removed may be selected based on the model of engine or generator. The partition to be removed may be selected by the user based on the performance of the engine or generator or based on the noise produced by the engine or generator. The partitions 171 may be connected by a bar or other attachment that allows the partitions 171 to removed simultaneously.

Figures 9A, 9B, 9C:
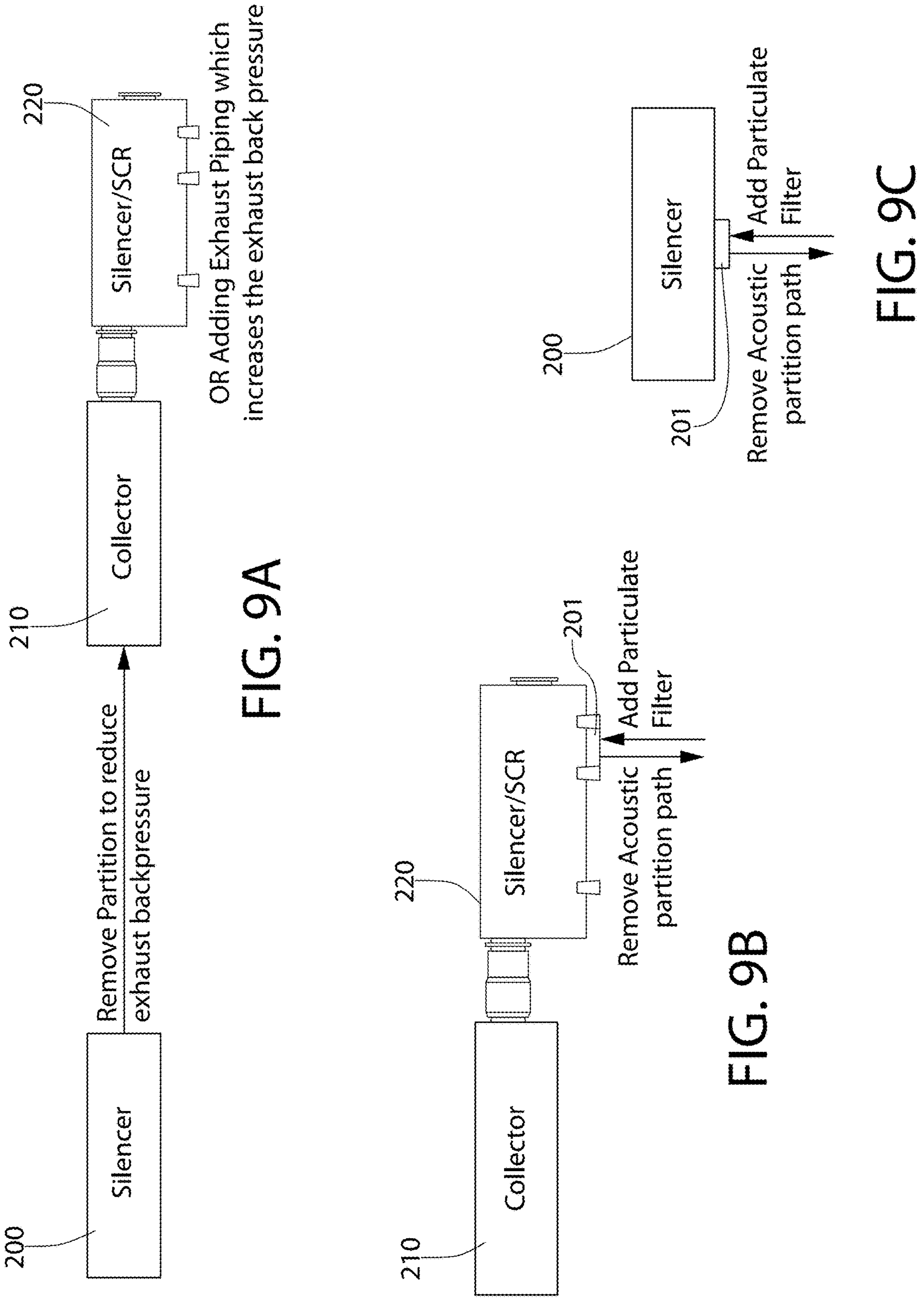
FIG. 9A illustrates a block diagram for a convertible silencer.
FIG. 9B illustrates another embodiment for a convertible silencer.
FIG. 9C illustrates another embodiment for a convertible silencer.

FIG. 9A illustrates a silencer 200 including a removable partition that is removed to reduce exhaust back pressure as described in any of the embodiments above. When the partition is removed the silencer 200 is converted to a collector 210. It many instances the partition may be removed in response to the addition of a selective catalytic reduction (SCR) device 220. It is noted that the SCR device 220 may also perform some functions of a silencer.

FIG. 9B illustrates a cartridge 201 that is also removable from the SCR device 220. The cartridge 201 may include a diesel particulate filter. The diesel particulate filter is configured to remove and capture diesel particulate matter or soot from exhaust gas. The diesel particulate filter may be configured for regeneration by burning or otherwise reacting with a catalyst to remove accumulate particulate matter or soot from the filter. The diesel particulate filter may also be removed for cleaning or removal of the matter or soot. The cartridge 201 may replace an acoustic partition in the SCR device 220. The acoustic partition may have a rectangular prism shape. The cartridge 201 may replace any of the partitions (e.g., partition 101) described in other embodiments herein.

FIG. 9C illustrates a silencer 200 (without the SCR device 220) with a removable acoustic partition that is replaced with the cartridge 201 including the diesel particulate filter.

Figure 10:
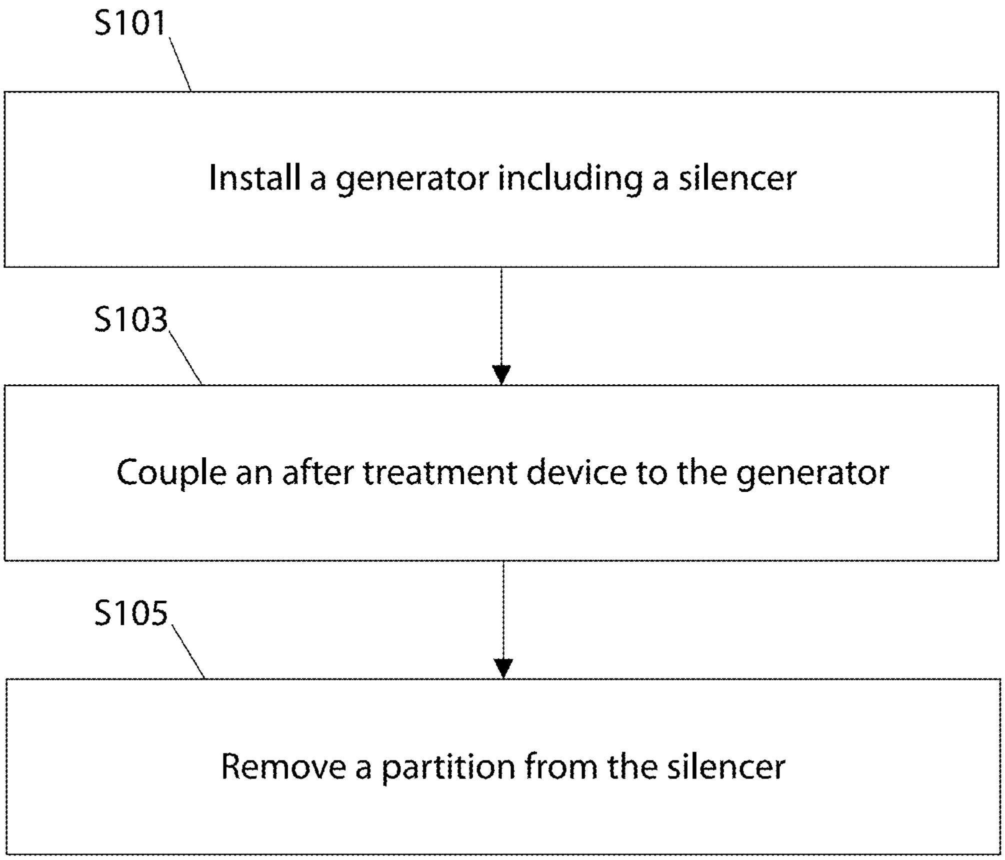
FIG. 10 illustrates a flow chart for the operation of a convertible silencer.

FIG. 10 illustrates a flow chart for the installation and operation of the convertible silencer 100. Additional, different, or fewer acts may be included.

In act S101, a generator is installed. The generator includes a muffler or silencer. The generator may be installed by placing the generator on a platform and connecting a fuel source to the generator. Electrical power may also be connected to the generator (e.g, a battery).

In act S103, an after treatment device is connected to the generator. The after treatment device includes a diesel particulate filter, a diesel oxidation catalyst device, or an SCR device. Alternatively, a smoke stack is installed on the generator. The smoke stack could also be lengthened.

In act S105, at least one partition is removed from the silencer or muffler. Removal of the at least one partition modifies the silencer to operate as a collector and cease operation as a muffler.

In another example, a motor or solenoid remove the partition. For example, the partition may be rotatable so that the solenoid or motor rotates the partition open or closed. The solenoid could also guide the partition in and out of the chamber of the silencer.

A button or other user input on the outside of generator may trigger the motor or solenoid to remove the partition from the exhaust path in the silencer.

In another example, the motor or solenoid is triggered by sensor data. A controller analyzes sensor data and generates a command for the motor or solenoid to open, close, and/or remove the partition from the exhaust path in the silencer. The sensor may be a pressure sensor in the exhaust path. When the pressure reaches a predetermined level, which may be caused by the installation of an after treatment device, the controller generates the command. The sensor may be a presence sensor for the after treatment device. That is, the sensor may be triggered when the after treatment device is installed. When presence of the after treatment device is detected, the controller generates the command.

In another example, a light or other indicator may be illuminated in response to the sensor data. A controller analyzes sensor data and generates a command for the indicator. The indicator communicates to the user or technician that the partition should be removed.

Returning to FIG. 1, an electric machine for the generator set 10 may include permanent magnets for the field of the main generator and/or exciter. The permanent magnets may be included in either the rotor or the stator. For example, the electric machine may include a main generator with a wound-field and an exciter with a permanent magnet field. Other embodiments of electrical machines include permanent magnet brush-type DC machines, permanent magnet brushless DC machines, series-wound or universal machines, induction AC machines, synchronous AC machines, synchronous reluctance machines, switched reluctance machines, among others. Any machine may be used as a motor, selectively between a motor and a generator, or entirely as a generator.

A voltage regulator may control the generator output through feedback control. For example, the voltage regulator may receive sensor data of an electrical parameter (e.g., voltage, current, power). The sensor data may be compared to a reference value based on a target output of the generator. The target output may be a set value, or a variable value determined by the voltage regulator. Based on the comparison, the voltage regulator may determine a difference (e.g., error signal) for controlling (increasing or decreasing) another parameter (e.g., field current, rotational velocity, air gap, field to armature alignment, or others). In one example, the field current is adjusted by increasing or decreasing the current flow to an exciter stator, resulting in a lower or higher voltage at the armature in the main generator stator. The electric machine is coupled to a prime mover such as the engine. It should be noted that while engine is used as a term to describe the prime mover, converting fuel to a rotational speed and torque applied to a generator, any apparatus capable of providing mechanical torque and rotation or of requiring mechanical torque and rotation may be coupled to an electrical machine, operating as a motor or a generator. An electrical machine may also provide torque without causing rotation, such as to hold a position against a load. Thus, rotation is not required to define a device as an electrical machine.

In general, the generator or genset, generates electrical energy or power from mechanical energy. The motor, on the other hand, receives electrical energy and converts it to mechanical energy by producing load torque. A power source or prime mover produces a driving torque. This torque will oppose the load torque and cause rotation of the rotor of the electric machine at some velocity. The prime mover may be an internal combustion engine.

An internal combustion engine may have performance characteristics where the available torque may vary with the rotational velocity. As such, the engine may not provide adequate torque at lower velocity. If the load torque for the engine is greater than the available torque, speed decreases.

The electric machine may be coupled to an internal combustion engine as the prime mover, operating at some nominal velocity. The electric machine may have an electrical load as electrical energy. This load will be converted to a mechanical energy as torque. As larger loads are applied, greater torque may be created. As greater load torque is applied to the engine, velocity or speed may decrease. If torque is not reduced, the engine speed may continue to decrease. It may be advantageous to reduce the load to a level where the engine may overcome this torque and bring the speed back to the nominal value.

Further, the engine maybe be configured for a constant speed or a variable speed that varies based on the load. Likewise, the alternator may be included in a variable speed generator.

In any of these examples, a voltage regulator may provide feedback control to maintain the desired output target voltage of the electric machine. In addition, the resistance of the load impacts the response of output control. The following embodiments provide systems and techniques for maintaining a desired speed in an electrical machine under a load resistance that varies in time.

An electrical load may have a real component and a reactive component. The electric load includes the real component, measured in electric watts, which is directly related to the resulting load torque. The real component, or watts, can be calculated as the product of the real component of the load current and the applied voltage. The real component of the load current is dependent on the resistive component or resistance of the load and the applied voltage, where current equals voltage divided by resistance (Ohm's Law). If an electrical load is applied to an electric machine, there will be a resulting load torque applied to the prime mover.

Some electrical machines, such as sealed machines, liquid-cooled machines and high-efficiency machines, may not require a cooling fan to maintain the internal components to a stable temperature. In addition, some electrical machines, such as induction machines, brushless DC machines, and switched reluctance machines, may contain fewer rotating elements in the rotor assembly. Further, some electrical machines, such as large synchronous machines and brush-type DC machines may contain more or different rotating elements in the rotor assembly.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

When a component, device, element, or the like of the present disclosure is described as having a purpose or performing an operation, function, or the like, the component, device, or element should be considered herein as being "configured to" meet that purpose or to perform that operation or function.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A silencer for noise reduction at an internal combustion engine, the silencer comprising:

an input opening configured to be placed in communication with the internal combustion engine;

an output opening;

a chamber; and a partition configured to be inserted into and removed from the chamber, wherein the partition is removable from the chamber to convert the silencer to a collector.

2. The silencer of claim 1, wherein the output opening is connected to an after treatment device and the after treatment device affects back pressure in the chamber.

3. The silencer of claim 2, wherein the after treatment device includes a device selected from a diesel particulate filter, a diesel oxidation catalyst device, and/or a selective catalytic reduction device.

4. The silencer of claim 1, wherein the output opening is connected to a pipe to discharge exhaust into open air, wherein the pipe affects back pressure in the chamber.

5. The silencer of claim 1, further comprising a handle coupled to the partition.

6. The silencer of claim 1, wherein the partition comprises one of a plurality of partitions configured to be inserted into and removed from the chamber, wherein the partitions are removable from the chamber to convert the silencer to a collector.

7. The silencer of claim 6, wherein the plurality of partitions are arranged in a predetermined pattern.

8. The silencer of claim 1, further comprising a latch configured to secure the partition to the chamber.

9. A generator, comprising:

an engine;

an alternator driven by the engine; and a silencer system, comprising:

an input opening in communication with the engine;

an output opening;

a chamber in communication with the input opening and the output opening; and a partition removably positioned in the chamber.

10. The generator of claim 9, wherein the chamber comprises a resonant chamber configured to reflect sound waves from the engine such that the sound waves are at least partially cancelled out when the partition is positioned in the chamber.

11. The generator of claim 10, wherein the chamber is not a resonant chamber configured to at least partially cancel out sound waves from the engine when the partition is removed from the chamber.

12. The generator of claim 11, wherein the silencer system further comprises:

a housing including the input opening, the output opening, and the chamber;

a housing opening defined in the housing that is configured to receive the partition; and a cover attachable to the housing to enclose the housing opening when the partition is not positioned in the housing opening.

13. The generator of claim 10, wherein the silencer system further comprises:

a housing including the input opening, the output opening, and the chamber;

a housing opening defined in the housing that is configured to receive the partition; and a diesel particulate filter configured to be inserted into the housing opening in lieu of the partition.

14. The generator of claim 13, wherein the chamber is not a resonant chamber configured to at least partially cancel out sound waves from the engine when the diesel particulate filter is positioned in the housing opening.

15. The generator of claim 9, wherein the silencer system becomes an exhaust collector when the partition is removed from the chamber.

16. The generator of claim 9, wherein the chamber comprises a first chamber, wherein the partition comprises a first partition, wherein the silencer system further comprises a second chamber and a second partition, wherein the second partition is configured to be inserted into and removed from the second chamber, and wherein the silencer system becomes an exhaust collector when the first partition is removed from the first chamber and the second partition is removed from the second chamber.

17. The generator of claim 16, wherein the first chamber comprises a resonant chamber configured to reflect sound waves from the engine such that the sound waves are at least partially cancelled out when the first partition is positioned in the first chamber, and wherein the second chamber comprises a resonant chamber configured to reflect sound waves from the engine such that the sound waves in the second chamber are at least partially cancelled out when the second partition is positioned in the second chamber.

18. The generator of claim 17, wherein the first chamber is not a resonant chamber configured to at least partially cancel out sound waves from the engine when the first partition is not positioned in the first chamber, and wherein the second chamber is not a resonant chamber configured to at least partially cancel out sound waves from the engine when the second partition is not positioned in the second chamber.

19. A method for converting an exhaust silencer for a generator to an exhaust collector, the method comprising:

installing a generator including a silencer; and removing a partition from a chamber in the silencer.

* * * * *